(12) United States Patent
Qiu

(10) Patent No.: US 12,716,278 B2
(45) Date of Patent: Aug. 25, 2026

(54) PET CRATE

(71) Applicant: JIANGSU ZHONGHENG PET ARTICLES JOINT-STOCK CO., LTD., Jiangsu (CN)

(72) Inventor: Bin Qiu, Jiangsu (CN)

(73) Assignee: JIANGSU ZHONGHENG PET ARTICLES JOINT-STOCK CO., LTD., Jiangsu (CN)

( * ) Notice: Subject to any disclaimer, the term of this patent is extended or adjusted under 35 U.S.C. 154(b) by 0 days.

(21) Appl. No.: 19/026,587

(22) Filed: Jan. 17, 2025

(65) Prior Publication Data

US 2026/0071471 A1 Mar. 12, 2026

(30) Foreign Application Priority Data

Sep. 6, 2024 (CN) ......................... 202422190902.8
Sep. 20, 2024 (CN) ......................... 202422300704.2

(51) Int. Cl.
*E05C 9/18* (2006.01)
*A01K 1/03* (2006.01)
*E05C 9/08* (2006.01)

(52) U.S. Cl.
CPC ............ *E05C 9/1841* (2013.01); *A01K 1/034* (2013.01); *E05C 9/08* (2013.01)

(58) Field of Classification Search
CPC .............................. A01K 1/034; E05C 9/1841
See application file for complete search history.

(56) References Cited

U.S. PATENT DOCUMENTS 1,064,313 A * 6/1913 Garlock .............. E05B 65/0864 292/60
1,675,033 A * 6/1928 Lefkovitz ................. E05C 1/04 292/60
1,696,045 A * 12/1928 Lach ....................... E05B 55/00 70/DIG. 79
2,714,030 A * 7/1955 Gardner .................... E05C 1/10 292/DIG. 20
3,907,150 A * 9/1975 Jurasek ............. B65D 21/0211 292/57
4,023,698 A * 5/1977 Joseph .................. B65D 19/12 217/15
5,071,176 A * 12/1991 Smith ....................... E05C 9/16 292/7
6,681,720 B1 * 1/2004 Skurdalsvold ......... A01K 1/034 119/462
6,783,162 B1 * 8/2004 Harper ................ A01K 1/0245 292/336.3
9,936,672 B2 * 4/2018 Link ..................... E05C 19/006
2010/0294206 A1 * 11/2010 Kaneda ................. A01K 31/02 119/501
2012/0227328 A1 * 9/2012 Link ..................... A01K 1/034 49/394

(Continued)

*Primary Examiner* — Timothy D Collins
*Assistant Examiner* — Brittany A Lowery
(74) *Attorney, Agent, or Firm* — JCIPRNET

(57) ABSTRACT

The present disclosure relates to the field of pet supplies, and in particular, to a door lock for a pet crate. The door lock for a pet crate provided in the present disclosure includes a crate body provided with a door opening; a door body including an end rotatably connected to a side of the door opening; a first locking assembly connected to the door body; and a second locking assembly connected to the door body or a side of the crate body adjacent to the door body.

5 Claims, 6 Drawing Sheets

(56) References Cited

U.S. PATENT DOCUMENTS

| | | | | |
|---|---|---|---|---|
| 2014/0109839 | A1* | 4/2014 | Cantwell | A01K 1/033<br>49/394 |
| 2016/0348401 | A1* | 12/2016 | Veness | A01K 1/0035 |
| 2017/0295748 | A1* | 10/2017 | He | A01K 1/034 |
| 2019/0029216 | A1* | 1/2019 | Volin | A01K 1/034 |

* cited by examiner

PET CRATE

CROSS REFERENCE TO THE RELATED APPLICATIONS

This application is based upon and claims priority to Chinese Patent Application Nos. 202422190902.8 and 202422300704.2, filed on Sep. 6, 2024 and Sep. 20, 2024, the entire contents of which are incorporated herein by reference.

TECHNICAL FIELD

The present disclosure relates to the field of pet supplies, and in particular, to a door lock for a pet crate.

BACKGROUND

It is necessary to have a pet crate for keeping a pet, and the use of the pet crate requires a door lock for the pet crate. The door lock for the pet crate is a device for locking the crate door. With the improvement of living standards, pet keeping is becoming increasingly common. Most pets need to be kept in crates so as to prevent them from running around. With the continuous development of technology, people have increasingly high requirements for the manufacturing process of door locks for pet crates.

Generally, the door lock for a pet crate is provided in the middle, making upper and lower corners of a crate door prone to deforming and forming gaps under external forces, especially in the case of keeping a large dog.

SUMMARY

In order to solve the technical problem that generally, a door lock for a pet crate is located in a middle, making upper and lower corners of a crate door prone to deforming and forming gaps under external forces, an objective of the present disclosure is to provide a door lock for a pet crate.

To achieve the above objective, an embodiment of the present disclosure provides a door lock for a pet crate, including:

- a crate body, where the crate body is provided with a door opening;
- a door body, where the door body includes an end rotatably connected to a side of the door opening;
- a first locking assembly, where the first locking assembly is connected to the door body; and
- a second locking assembly, where the second locking assembly is connected to the door body or a side of the crate body adjacent to the door body.

In the above technical solution, the first locking assembly includes:

- mounting rods, where the mounting rods are connected to a side of the door body away from the crate body;
- a rotating rod, where the rotating rod is rotatably connected between the mounting rods and the door body;
- a handle, where the handle is connected to the rotating rod; and
- two hooks, where the two hooks are respectively connected to two ends of the rotating rod, and are respectively provided at upper and lower sides of the door body.

In the above technical solution, the second locking assembly includes:

- a first mounting seat, where the first mounting seat is connected to the door body or the side of the crate body adjacent to the door body;
- a second mounting seat, where the second mounting seat is connected to a side of the first mounting seat away from the crate body; and
- a slider, where the slider is slidably connected to the second mounting seat.

In the above technical solution, the handle is U-shaped.

In the above technical solution, a fixed seat is connected to the side of the door body away from the crate body; the rotating rod is rotatably connected between the fixed seat and the door body; and two ends of the handle are provided inside the fixed seat.

In the above technical solution, a fixed case is connected to the side of the door body away from the crate body; the rotating rod runs through the fixed case; the fixed case includes a coil spring located inside the fixed case and wound around the rotating rod; the coil spring includes one end connected to the fixed case and an other end connected to the rotating rod; and two ends of the handle are provided outside the fixed case.

In the above technical solution, a limit plate is fixedly connected to an end of the first mounting seat adjacent to the rotating rod.

Additional aspects and advantages of the present disclosure will become apparent in the following description or will be understood through the practice of the present disclosure.

BRIEF DESCRIPTION OF THE DRAWINGS

The above and/or additional aspects and advantages of the present disclosure will become apparent and readily comprehensible from the description of embodiments in conjunction with the following drawings, where.

Figure 1:
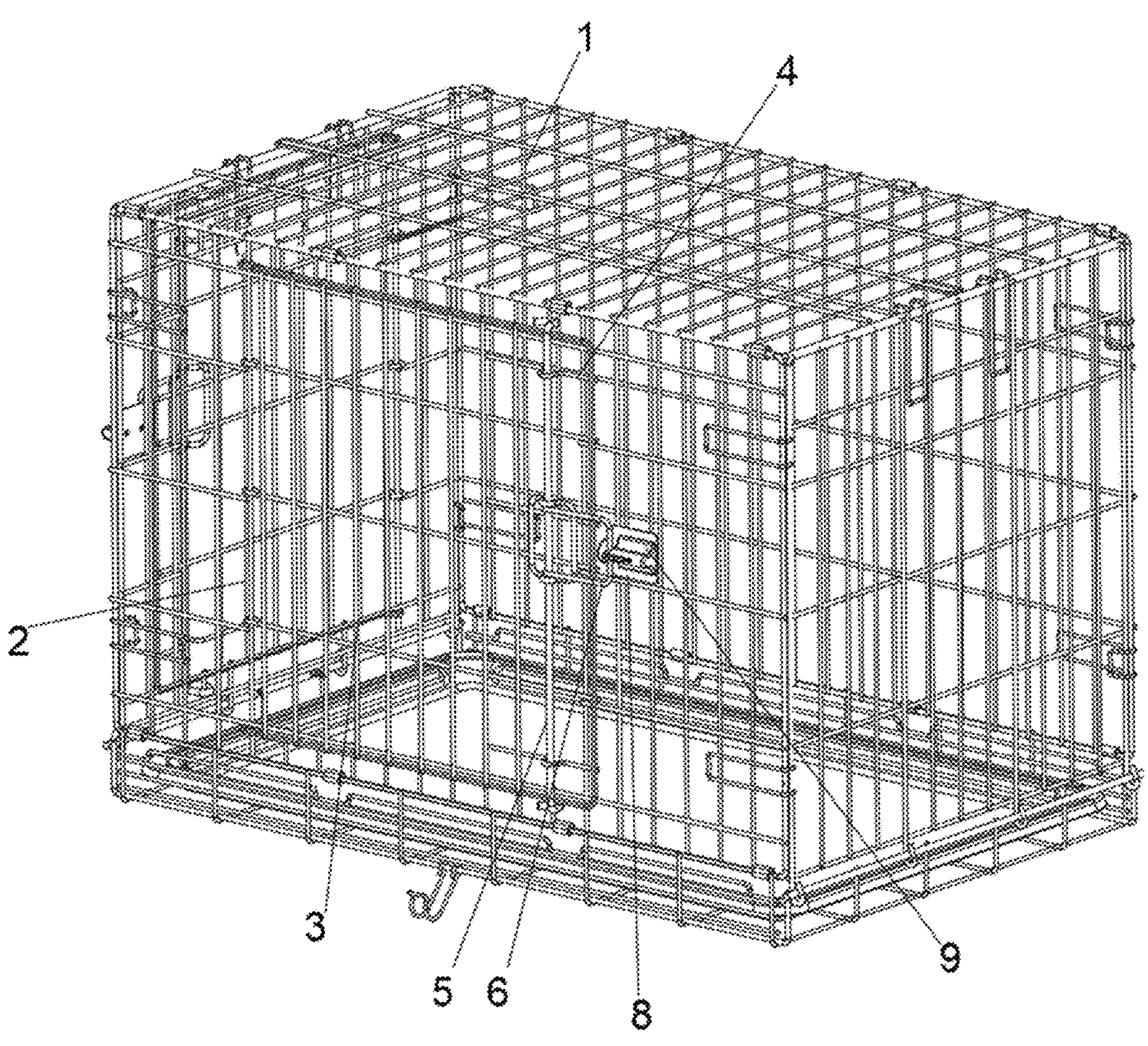
FIG. 1 is a schematic diagram of an overall structure of a door lock for a pet crate according to the present disclosure.
Figure 2:
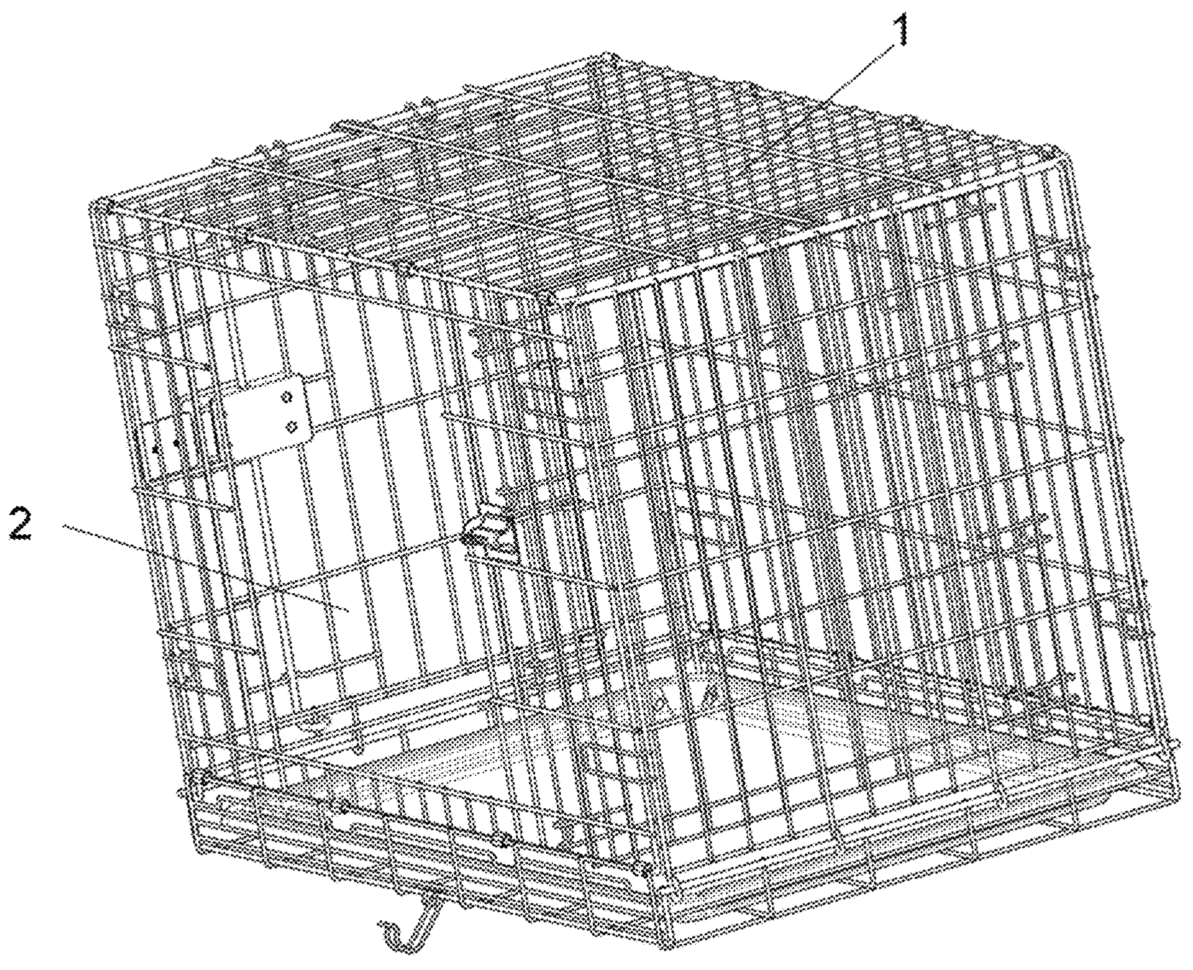
FIG. 2 is a schematic structural diagram of a crate body according to the present disclosure.

Reference numerals in FIGS. 1 to 6 are as follows:

1. crate body; 2. door opening; 3. door body; 4. mounting rod; 5. rotating rod; 6. handle; 7. hook; 8. first mounting seat; 9. second mounting seat; 10. slider; 11. fixed seat; 12. fixed case; 13. coil spring; and 14. limit plate.

DETAILED DESCRIPTION OF THE EMBODIMENTS

To understand the above objectives, features, and advantages of the present disclosure more clearly, the present disclosure is further described in detail below with reference to the drawings and specific implementations. It should be noted that the embodiments of the present disclosure and features of the embodiments may be combined with each other in case of no conflict.

Many specific details are set forth in the following description to facilitate a full understanding of the present disclosure. However, the present disclosure can also be implemented in other ways different from those described herein. Therefore, the protection scope of the present disclosure is not limited by the specific embodiments disclosed below.

Some embodiments of a door lock for a pet crate according to the present disclosure are described below with reference to FIGS. 1 to 6.

As shown in FIGS. 1 to 6, an embodiment of the present disclosure provides a door lock for a pet crate, including a crate body 1, a door body 3, a first locking assembly, and a second locking assembly.

Specifically, the crate body 1 includes a door opening 2; the door body 3 including a left end rotatably connected to a left end of the door opening 2; the first locking assembly connected to the door body 3; and the second locking assembly connected to a side of the door body 3 away from the crate body 1 or a side of the crate body 1 adjacent to the door body 3.

To lock the door body 3, the first locking assembly and the crate body 1 cooperate, so that two corners of a right end of the door body 3 are fixed, improving the stability of the door body 3 and avoiding deformation of the door body 3 due to an impact.

When the second locking assembly is fixedly provided at the side of the door body 3 away from the crate body 1, the second locking assembly can be provided at a left side or a right side of the first locking assembly. In the present disclosure, for example, the second locking assembly is provided at the right side of the first locking assembly. The first locking assembly is fixed through the second locking assembly, so that the first locking assembly is prevented from displacing after it locks the door body, improving the stability of the first locking assembly.

When the second locking assembly is fixedly provided at the side of the crate body 1 adjacent to the door body 3, the second locking assembly can be provided at a left side or a right side of the door opening 2. In the present disclosure, for example, the second locking assembly is provided at the right side of the door opening 2. The first locking assembly is fixed through the second locking assembly, so that the first locking assembly is prevented from displacing after it locks the door body, improving the stability of the first locking assembly. In addition, the first locking assembly cooperates with the second locking assembly, so that a middle of the right end of the door body 3 is fixed, further improving the stability of the door body 3 and further avoiding deformation of the door body 3 due to an impact.

As shown in FIGS. 1 to 6, in an embodiment of the present disclosure, the first locking assembly includes two mounting rods 4, a rotating rod 5, a handle 6, and two hooks 7. The two mounting rods 4 are fixedly connected to the side of the door body 3 away from the crate body 1, and are located in a same vertical direction and adjacent to an edge of the right end of the door body 3. The rotating rod 5 is rotatably connected between the mounting rods 4 and the door body 3. The handle 6 is U-shaped. Two ends of the handle 6 are fixedly connected to the rotating rod 5. The two hooks 7 are respectively fixedly connected to upper and lower ends of the rotating rod 5, and are respectively provided at upper and lower sides of the door body 3. The hooks 7 are U-shaped or V-shaped. In the present disclosure, for example, the hooks 7 are V-shaped.

The second locking assembly includes a first mounting seat 8 fixedly connected to the side of the door body 3 away from the crate body 1 or the side of the crate body 1 adjacent to the door body 3; a second mounting seat 9 fixedly connected to a side of the first mounting seat 8 away from the crate body 1; and a slider 10 slidably connected in the second mounting seat 9.

When the first mounting seat 8 is fixedly connected to the side of the door body 3 away from the crate body 1, the first mounting seat 8 can be provided at a right side or a left side of the rotating rod 5. In the present disclosure, for example, the first mounting seat 8 is provided at the right side of the rotating rod 5. To lock the door body 3, first, the door body 3 is rotated to the right, so that the door body 3 is in a closed state with the crate body 1. Then, the handle 6 is rotated to the right, causing the rotating rod 5 to rotate. When the handle 6 is pushed onto the first mounting seat 8, an end of the handle 6 away from the rotating rod 5 moves to a left side of the second mounting seat 9. At this point, since the second mounting seat 9 has an area smaller than an area of the first mounting seat 8, the handle 6 will not come into contact with the second mounting seat 9, but only with the first mounting seat 8. Next, the slider 10 is pulled to the left until a left end of the slider 10 moves to a side of the handle 6 away from the crate body 1. The slider 10 has a limiting effect on the handle 6, preventing the end of the handle 6 away from the rotating rod 5 from rotating in a direction away from the crate body 1. When the door body 3 is closed and the rotation of the handle 6 does not start, an end of the hook 7 away from the rotating rod 5 extends vertically into the crate body 1. At this point, the hook 7 is staggered from a rail of the crate body 1, allowing the door body 3 to be opened at any time. When the rotation of the handle 6 starts, the handle 6 drives the rotating rod 5 to rotate, and the rotating rod 5 drives the hook 7 to rotate. When the hook 7 is rotated, it gradually wraps around a rail closest to the hook. When the handle 6 is locked, the end of the hook 7 away from the rotating rod 5 extends out of the crate body 1. Due to the fact that the hook 7 is V-shaped, when the handle 6 is not rotated, an opening of the hook 7 faces an interior of the crate body 1. When the handle 6 is rotated, the opening of the hook 7 faces an outside of the crate body 1, and the hook 7 is hooked onto the rail of the crate body 1 closest to the hook. Therefore, the hooks 7 cooperate with the rails of the crate body 1, so that the two corners of the right end of the door body 3 are locked, improving the stability of the entire door body 3 and avoiding deformation of the corners of the door body 3 due to an impact.

When the first mounting seat 8 is fixedly connected to the side of the crate body 1 adjacent to the door body 3, the first mounting seat 8 can be provided at the left side or the right side of the door opening 2. In the present disclosure, for example, the first mounting seat 8 is provided at the right side of the door opening 2. To lock the door body 3, first, the door body 3 is rotated to the right, so that the door body 3 is in a closed state with the crate body 1. Then, the handle 6 is rotated to the right, causing the rotating rod 5 to rotate. When the handle 6 is pushed onto the first mounting seat 8, an end of the handle 6 away from the rotating rod 5 moves to a left side of the second mounting seat 9. At this point, since the second mounting seat 9 has an area smaller than an area of the first mounting seat 8, the handle 6 will not come into contact with the second mounting seat 9, but only with the first mounting seat 8. Next, the slider 10 is pulled to the left until a left end of the slider 10 moves to a side of the handle 6 away from the crate body 1. The slider 10 has a limiting effect on the handle 6, preventing the end of the handle 6 away from the rotating rod 5 from rotating in a direction away from the crate body 1. After the position of the handle 6 is fixed, the handle 6 and the slider 10 cooperate to fix the position of the middle of the right end of the door body 3, so that the door body 3 plays a locking role. When the door body 3 is closed and the rotation of the handle 6 does not start, an end of the hook 7 away from the rotating rod 5 extends vertically into the crate body 1. At this point, the hook 7 is staggered from a rail of the crate body 1, allowing the door body 3 to be opened at any time. When the rotation of the handle 6 starts, the handle 6 drives the rotating rod 5 to rotate, and the rotating rod 5 drives the hook 7 to rotate. When the hook 7 is rotated, it gradually wraps around a rail closest to the hook. When the handle 6 is locked, the end of the hook 7 away from the rotating rod 5 extends out of the crate body 1. Due to the fact that the hook 7 is V-shaped, when the handle 6 is not rotated, an opening of the hook 7 faces an interior of the crate body 1. When the handle 6 is rotated, the opening of the hook 7 faces an outside of the crate body 1, and the hook 7 is hooked onto the rail of the crate body 1 closest to the hook. Therefore, the hooks 7 cooperate with the rails of the crate body 1, so that the two corners of the right end of the door body 3 are locked, improving the stability of the entire door body 3 and avoiding deformation of the corners of the door body 3 due to an impact.

The hooks 7 cooperate with the rails of the crate body 1 so that the two corners of the right end of the door body 3 are fixed, and the handle 6 cooperates with the slider 10 so that the middle of the right end of the door body 3 is fixed. These two locking methods improve the stability of the door body 3 and avoid deformation of the door body 3 due to an impact.

As shown in FIGS. 3 to 6, in an embodiment of the present disclosure, a limit plate 14 is fixedly connected to an end of the first mounting seat 8 adjacent to the rotating rod 5.

The limit plate 14 is fixedly connected to the end of the first mounting seat 8 adjacent to the rotating rod 5, so that the limit plate 14 has a limiting effect on the slider 10. Thus, the slider 10 is prevented from sliding too much to the left, thereby preventing the slider 10 from completely sliding out of the second mounting seat 9, reducing the difficulty of mounting the slider 10.

Embodiment 1

Figure 3:
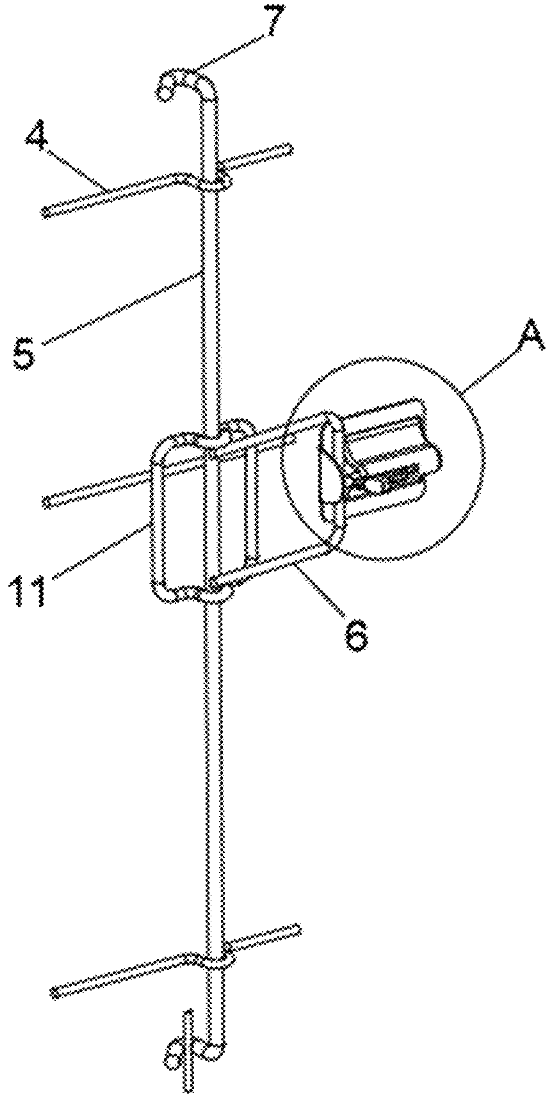
FIG. 3 is a schematic structural diagram of a first locking assembly and a second locking assembly according to Embodiment 1 of the present disclosure.
Figure 4:
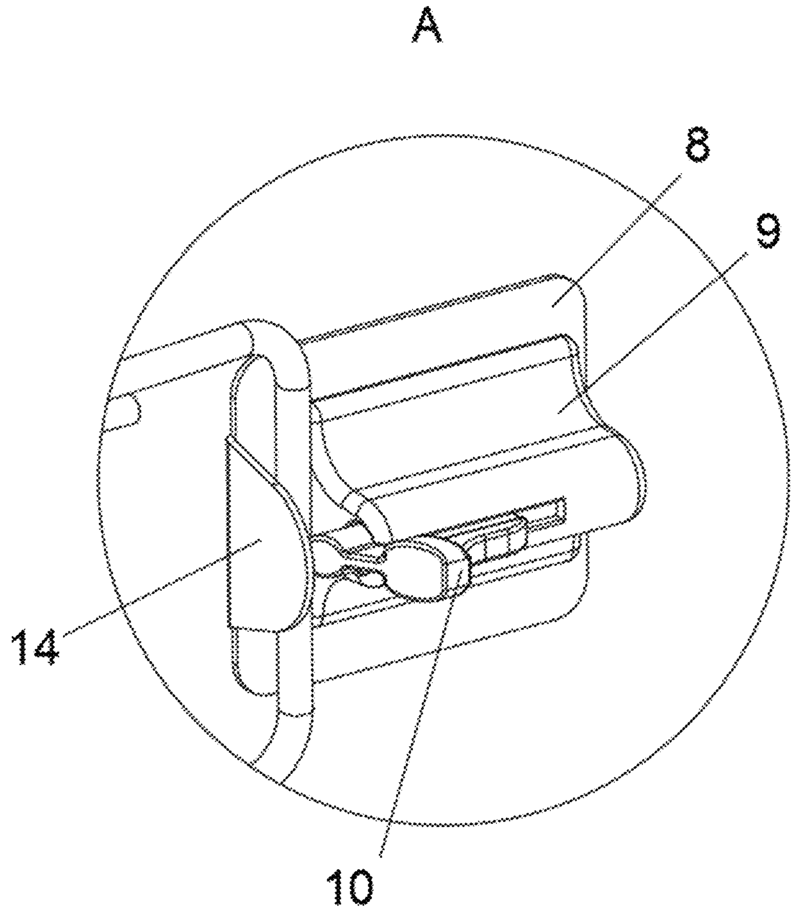
FIG. 4 is a schematic diagram of an enlarged structure of part A according to Embodiment 1 of the present disclosure.

As shown in FIGS. 3 and 4, in an embodiment of the present disclosure, a fixed seat 11 is fixedly connected to the side of the door body 3 away from the crate body 1. The fixed seat 11 has a hollow structure in a front-to-back direction. The rotating rod 5 is rotatably connected between the fixed seat 11 and the door body 3. The two ends of the handle 6 are located inside the hollow structure. That is, upper and lower ends of the handle 6 are respectively provided at a top and a bottom of the hollow structure.

The upper and lower ends of the handle 6 are respectively provided at the top and bottom of the hollow structure, so that the two ends of the handle 6 are in contact with the fixed seat 11. In addition, the rotating rod 5 is provided between the fixed seat 11 and the door body 3 and the two ends of the handle 6 are fixedly connected to the rotating rod 5, so that the handle 6 and the fixed seat 11 are staggered from each other. In this way, the handle 6 is fixed in the vertical direction to avoid displacement of the handle 6 in the vertical direction.

Embodiment 2

Figure 5:
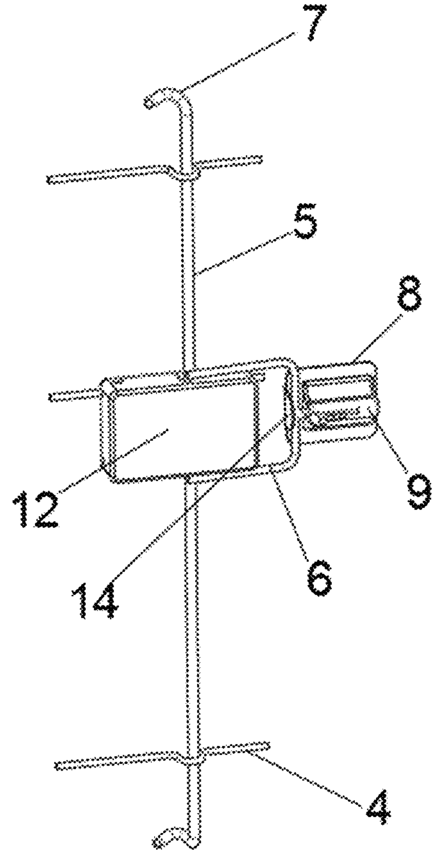
FIG. 5 is a schematic structural diagram of a first locking assembly and a second locking assembly according to Embodiment 2 of the present disclosure.
Figure 6:
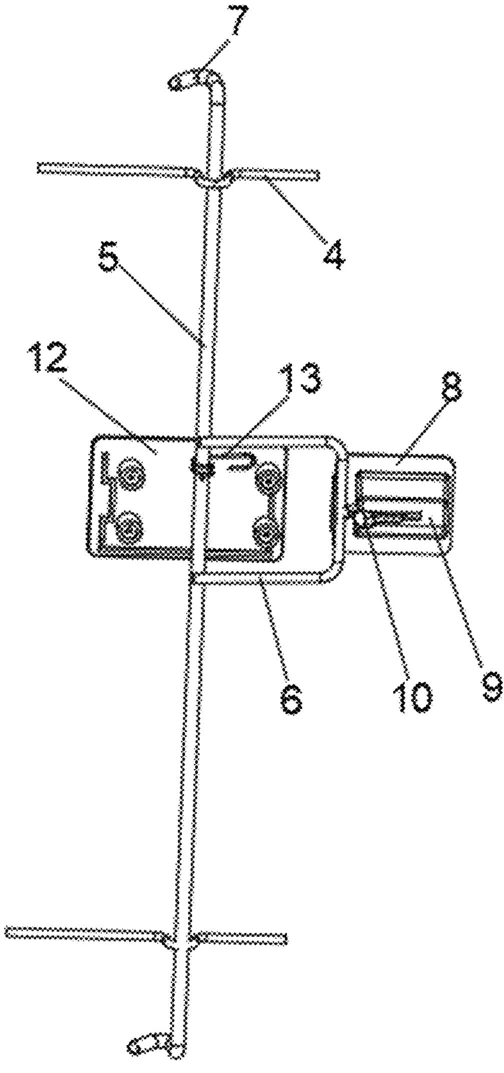
FIG. 6 is a schematic diagram of an internal structure of a fixed case according to Embodiment 2 of the present disclosure.

As shown in FIGS. 5 and 6, in an embodiment of the present disclosure, a fixed case 12 is fixedly connected to the side of the door body 3 away from the crate body 1. The rotating rod 5 runs through the fixed case 12. The fixed case 12 includes a coil spring 13 located inside the fixed case 12 and wound around the rotating rod 5. The coil spring 13 includes one end fixedly connected to the fixed case 12 and the other end fixedly connected to the rotating rod 5. The two ends of the handle 6 are provided outside the fixed case 12. The upper end of the handle 6 is in contact with a top of the fixed case 12, and the lower end of the handle 6 is in contact with a bottom of the fixed case 12.

When there is no external force acting on the rotating rod 5, the torsion spring is in a slack state, and the handle 6 fixedly connected to the rotating rod 5 forms an angle with the door body 3. Therefore, it is necessary to push the end of the handle 6 away from door body 3 towards the door body 3. During this process, the torsion spring undergoes deformation, generating a push force on an operator. Then, the handle 6 is continuously pushed to the right until the handle 6 is pushed to the first mounting seat 8. Next, the slider 10 limits the handle 6. To open the door body 3, the slider 10 is pulled to the right. The torsion spring is restored to drive the rotating rod 5 to rotate. In this way, the handle 6 can automatically pop out the first mounting seat 8, without the need for a user to pull the handle 6 to the left, reducing the user's operating steps. The upper and lower ends of the handle 6 are respectively provided at the top and bottom of the fixed case 12, so that the handle 6 is limited, preventing the handle 6 from displacing in the vertical direction.

The present disclosure has the following advantages.

1. The first locking assembly cooperates with the rails of the crate body 1, so that the two corners of the door body 3 are fixed, improving the stability of the door body 3 and reducing deformation and damage caused to the door body 3 due to an impact.
2. The first locking assembly cooperates with the second locking assembly, so that the middle of the right end of the door body 3 is fixed, further improving the stability of the door body 3.
3. The first locking assembly cooperates with the second locking assembly, so that the locking of the door body 3 is completed only by rotating the first locking assembly and sliding the second locking assembly, thereby achieving a simple locking process.

In the present disclosure, the terms such as "provided", "connected to", "connected", and "fixed" should be comprehended in a broad sense. For example, "connected" may be comprehended as fixedly connected, detachably connected, or integrally connected, and "connected to" may be directly connected to or indirectly connected to through an intermediary. Those of ordinary skill in the art may understand the specific meanings of the above terms in the present disclosure based on specific situations.

In the description of the present disclosure, it should be understood that orientation or position relationships indicated by terms such as "inside" and "outside" are orientation or position relationships shown in the drawings, and these terms are just used to facilitate description of the present disclosure and simplify the description, but not to indicate or imply that the mentioned apparatus or elements must have a specific orientation and must be constructed and operated in a specific orientation, and thus, these terms cannot be understood as a limitation to the present disclosure.

In the description of this specification, the description with reference to the terms such as "one embodiment", "some embodiments", and "a specific embodiment" means that the specific features, structures, materials, or characteristics described with reference to the embodiment or example are included in at least one embodiment or example of the present disclosure. In this specification, the schematic descriptions of the above terms do not necessarily refer to the same embodiment or example. Moreover, the specific features, structures, materials, or characteristics described may be combined in any suitable manner in any one or more embodiments or examples.

The above are merely preferred embodiments of the present disclosure, and are not intended to limit the present disclosure, and various changes and modifications can be made by those skilled in the art to the present disclosure. Any modifications, equivalent substitutions, improvements, etc. made within the spirit and principle of the present disclosure should be included in the protection scope of the present disclosure.

What is claimed is:

1. A pet crate, comprising:

a crate body, wherein the crate body is provided with a door opening;

a door body, wherein the door body comprises an end rotatably connected to a side of the door opening;

a first locking assembly, wherein the first locking assembly is connected to the door body, and the first locking assembly comprises:

mounting rods, wherein the mounting rods are connected to a side of the door body away from the crate body;

a rotating rod, wherein the rotating rod is rotatably connected between the mounting rods and the door body;

a handle, wherein the handle is connected to the rotating rod; and two hooks, wherein the two hooks are respectively connected to two ends of the rotating rod, and are respectively provided at upper and lower sides of the door body;

a second locking assembly, wherein the second locking assembly is connected to the door body or a side of the crate body adjacent to the door body;

a fixed case connected to the side of the door body away from the crate body, wherein the rotating rod runs through the fixed case, and the fixed case comprises a coil spring located inside the fixed case and wound around the rotating rod, wherein the coil spring comprises one end connected to the fixed case and an other end connected to the rotating rod, and two ends of the handle are provided outside the fixed case.

2. The pet crate according to claim 1, wherein the second locking assembly comprises:

a first mounting seat, wherein the first mounting seat is connected to the door body or the side of the crate body adjacent to the door body;

a second mounting seat, wherein the second mounting seat is connected to a side of the first mounting seat away from the crate body; and a slider, wherein the slider is slidably connected to the second mounting seat.

3. The pet crate according to claim 1, wherein the handle is U-shaped.

4. The door lock for the pet crate according to claim 1, wherein a fixed seat is connected to the side of the door body away from the crate body; the rotating rod is rotatably connected between the fixed seat and the door body; and two ends of the handle are provided inside the fixed seat.

5. The pet crate according to claim 2, wherein a limit plate is fixedly connected to an end of the first mounting seat adjacent to the rotating rod.

* * * * *